United States Patent [19]

Jäckel

[11] Patent Number: 5,030,167
[45] Date of Patent: Jul. 9, 1991

[54] APPARATUS FOR DAMPING TORSIONAL VIBRATIONS

[75] Inventor: Johann Jäckel, Bühl, Fed. Rep. of Germany

[73] Assignee: Luk Lamellen und Kupplungsbau GmbH, Bühl, Fed. Rep. of Germany

[21] Appl. No.: 564,051

[22] Filed: Aug. 7, 1990

Related U.S. Application Data

[62] Division of Ser. No. 69,614, Jul. 2, 1987, Pat. No. 4,946,420.

[30] Foreign Application Priority Data

Jul. 5, 1986 [DE] Fed. Rep. of Germany ....... 3622697
Sep. 19, 1986 [DE] Fed. Rep. of Germany ....... 3631985
Dec. 13, 1986 [DE] Fed. Rep. of Germany ....... 3642687

[51] Int. Cl.$^5$ ............................................. F16D 3/14
[52] U.S. Cl. ........................................ 464/67; 464/24
[58] Field of Search ................. 464/7, 24, 64, 66, 67, 464/68; 74/574; 192/106.2

[56] References Cited

U.S. PATENT DOCUMENTS

| | | | |
|---|---|---|---|
| 4,351,167 | 9/1982 | Hanke et al. | 464/24 |
| 4,611,701 | 9/1986 | Friedman | 192/110 B |
| 4,638,684 | 1/1987 | Maucher | 192/106.2 X |
| 4,663,983 | 5/1987 | Kobayashi et al. | 464/68 X |
| 4,739,866 | 4/1988 | Reik et al. | 464/24 X |
| 4,782,718 | 11/1988 | Hartig et al. | 74/574 |

Primary Examiner—Thomas R. Hannon
Attorney, Agent, or Firm—Peter K. Kontler

[57] ABSTRACT

Apparatus for damping torsional vibrations in the power train of a motor vehicle has a first flywheel which defines an annular chamber for a supply of viscous fluid medium and carries one sealing device of a composite seal for separation of the chamber from the atmosphere. A second flywheel carries an antifriction bearing and the second sealing device of the composite seal. The first flywheel and the first sealing device form component parts of a first subassembly. The second flywheel, the second sealing device and the bearing form parts of a second subassembly. The two subassemblies are connected to each other in that the inner race of the bearing is slipped onto a cylindrical seat on an axial protuberance of the first flywheel and is retained on the protuberance of a ring which is affixed to the protuberance and overlies the inner race of the bearing. A torque-transmitting coupling between the second flywheel and the flange-like output member of a single damper or of two parallel-connected dampers in the chamber becomes operative in automatic response to attachment of the two subassemblies to each other.

16 Claims, 5 Drawing Sheets

APPARATUS FOR DAMPING TORSIONAL VIBRATIONS

This application is a division of application Ser. No. 069,611, filed July 2, 1987, now U.S. Pat. No. 4,946,420.

CROSS-REFERENCE TO RELATED CASES

Torsional vibration damping apparatus of the present invention are similar to those disclosed in the commonly owned copending patent application Ser. No. 069525 of Oswald Friedmann and Johann Jäckel filed July 2, 1987 for "Apparatus for damping vibrations" now abandoned. Other torsional vibration damping apparatus are disclosed in numerous copending United States patent applications as well as in numerous United States and foreign Letters Patent of the assignee of the present application.

BACKGROUND OF THE INVENTION

The invention relates to improvements in vibration damping apparatus, and more particularly to improvements in apparatus which can be used to damp torsional vibrations in the power trains between the engines and transmissions of motor vehicles. Still more particularly, the invention relates to improvements in torsional vibration damping apparatus of the type wherein a composite flywheel comprises several components which are rotatable relative to each other, wherein at least one antifriction bearing is interposed between such components, wherein one of the components is connectable to the engine and another component is connectable with the transmission, wherein one of the components defines an annular chamber for a supply of viscous fluid medium and wherein such chamber contains at least one damper which yieldably opposes rotation of the components of the composite flywheel relative to each other. As a rule, or in many instances, the second component is connectable with the input element of a change-speed transmission by a clutch, such as a friction clutch.

A drawback of presently known vibration damping apparatus of the above outlined character is their high initial and assembly cost. Moreover, the fluid medium is admitted into the chamber through specially provided inlets which must be properly sealed upon completed introduction of a requisite quantity of fluid medium. This also contributes to the initial cost of the apparatus and is a potential source of leakage when the apparatus is in actual use. Another drawback of such conventional apparatus is that sealing of the chamber for the supply of viscous medium from the atmosphere presents serious problems and is normally accomplished by employing a large number of complex and expensive sealing devices.

OBJECTS AND SUMMARY OF THE INVENTION

An object of the invention is to provide a vibration damping apparatus which is not only simpler, more compact and less expensive but also more reliable than heretofore known apparatus.

Another object of the invention is to provide the apparatus with novel and improved means for sealing the chamber for damper means from the atmosphere.

A further object of the invention is to provide the apparatus with novel and improved means for facilitating rapid assembly of its constituents into a unitary structure.

An additional object of the invention is to provide an apparatus whose useful life is longer than that of conventional apparatus and which is more efficient than previously known vibration damping apparatus.

An additional object of the invention is to provide a novel and improved method of grouping the constituents of the vibration damping apparatus prior to final assembly.

Another object of the invention is to provide a novel and improved method of admitting viscous fluid medium into the chamber of one component of the composite flywheel in the above outlined apparatus.

A further object of the invention is to provide the apparatus with novel and improved torque-transmitting coupling means and with novel and improved means for gathering leaking fluid medium for reintroduction into the chamber.

The invention resides in the provision of an apparatus for damping torsional vibrations, particularly in the power train between the engine and the transmission of a motor vehicle. The apparatus comprises a composite flywheel having a plurality of components which are rotatable relative to each other and include a first component connectable with the output element (such as a crankshaft) of the engine, and a second component connectable with the input element of the change-speed transmission of the vehicle, particularly by way of a clutch such as a friction clutch. One of the components defines an annular chamber for a supply of viscous fluid medium, and the apparatus further comprises damper means disposed in the chamber and serving to yieldably oppose rotation of the first and second components relative to each other. The composite flywheel and the damper means form two coaxial subassemblies, and the apparatus further comprises retaining means for connecting the two subassemblies to each other. In accordance with a feature of the invention, the subassemblies jointly comprise at least two of the following combinations:

(a) One of the subassemblies has a first sealing device and the other subassembly has a second sealing device which cooperates with the first sealing device to seal the chamber from the atmosphere;

(b) one of the subassemblies includes antifriction bearing means and the other subassembly includes a seat for the bearing means; and (c) one of the subassemblies includes a first coupling device and the other subassembly includes a complementary second coupling device. The coupling devices provide a torque-transmitting connection between the first and second components.

The annular chamber is preferably defined by the first component. One of the subassemblies preferably includes the first component and the damper means, and the other subassembly includes the second component. The damper means can comprise an output member (in the form of a disc-shaped flange) which includes the first coupling device, and the second sealing device can include a surface on one of the first and second components of the composite flywheel.

The first and second components preferably define an annular ventilating channel, and the sealing devices can serve to seal the chamber from the channel.

The damper means preferably includes (a) energy storing resilient elements acting in the circumferential direction of the composite flywheel and (b) the aforementioned flange-like output member which engages the resilient elements and has a central opening. One of the coupling devices is preferably provided on the output member and surrounds the opening. The other coupling device is then provided on the other of the first and second components. The other component preferably includes a discrete flywheel and a disc-shaped member which is affixed to the discrete flywheel and includes the other coupling device. One side of the discrete flywheel faces the one component, and the disc-shaped member is preferably secured to such side of the discrete flywheel against axial movement relative thereto.

The bearing means is preferably provided on the second component, and the seat is then provided on the one component. One of the first and second components has an axial recess and the bearing means is preferably installed in the recess. The seat is then provided on the other of the first and second components. Such other component is preferably the first component, and this first component is preferably provided with an axial protuberance which extends into the recess. The seat is provided on the protuberance. The retaining means can comprise a ring which is provided on the protuberance and abuts the bearing means so as to hold the bearing means against axial movement relative to the protuberance. The protuberance can include a shoulder which abuts the bearing means, and the bearing means is disposed between such shoulder and the ring.

The bearing means can comprise a first race on one of the components and a second race on the other component. The races have end faces which face away from the chamber, and the apparatus can further comprise means for sealing the bearing means including a sealing element which extends across the end faces. A similar sealing element can be provided to extend across those end faces of the first and second races which face toward the chamber.

The sealing means for the bearing means can include one or two sealing elements each of which is in engagement with one end face of one of the races and with one end face of the other race. The sealing element or elements can be provided in one of the two subassemblies. As a rule, the sealing element will be provided on the second component.

Sealing means in the form of one or more O-rings or the like can be interposed between at least one of the races and the respective component of the composite flywheel.

One of the sealing devices can include a substantially washer-like sealing member, and such sealing member is or can be elastically deformable in the axial direction of the composite flywheel.

One of the sealing devices can be provided on the first component and the other sealing device is then provided on the second component. One of these sealing devices is preferably maintained in axially stressed condition by the other sealing device.

One of the sealing devices can include a washer-like sealing member having a predetermined inner diameter and one of the coupling devices can have an outer marginal portion with a diameter which is less than the predetermined diameter.

The one component can include a section which is disposed between the output member of the damper means and the other component, and one of the sealing devices can have an outer marginal portion which is in sealing engagement with the section of the one component. Such section can include means for fixing the outer marginal portion of the one sealing device in a predetermined axial position.

As mentioned above, one of the sealing devices can be mounted on the first component, and such sealing device can have a central opening with a predetermined diameter. The other sealing device is then provided on the second component and has an outer diameter which exceeds the predetermined diameter. One of the coupling devices can be provided on the second component and can include a disc-shaped member with an outer diameter which is less than the outer diameter of the other sealing device. The other sealing device can be provided with a dished outer marginal portion which is spaced apart from the disc-shaped member in the axial direction of the second component.

The fluid medium can be admitted into the chamber prior to connection of the subassemblies to each other by the retaining means. The chamber is normally open in a region adjacent one of the sealing devices prior to connection of the subassemblies to each other, and the fluid medium can be admitted into the chamber in such region. This obviates the need for the making of a separate opening which would constitute an inlet for admission of fluid medium into the chamber. The admission of fluid medium into the chamber can take place while the subassembly which includes the chamber is in rotary motion. The rotational speed of the subassembly including the chamber during admission of fluid medium is preferably sufficiently high to ensure uniform distribution of the fluid medium under the action of centrifugal force during the admission of the fluid medium into the chamber.

The rotational speed is an overspeed at which the admitted fluid medium is uniformly distributed in the chamber so that it forms a ring having an inner surface at a constant distance from the axis of the subassembly which includes the chamber. Such subassembly is preferably balanced upon completed distribution of fluid medium in the chamber. The balancing can take place prior to connection of the subassembly which includes the chamber to the other of the subassemblies by the retaining means, or subsequent to such connection.

The fluid medium in the chamber is preferably a paste, i.e., a medium of high viscosity. In addition, the fluid medium preferably constitutes a lubricant.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
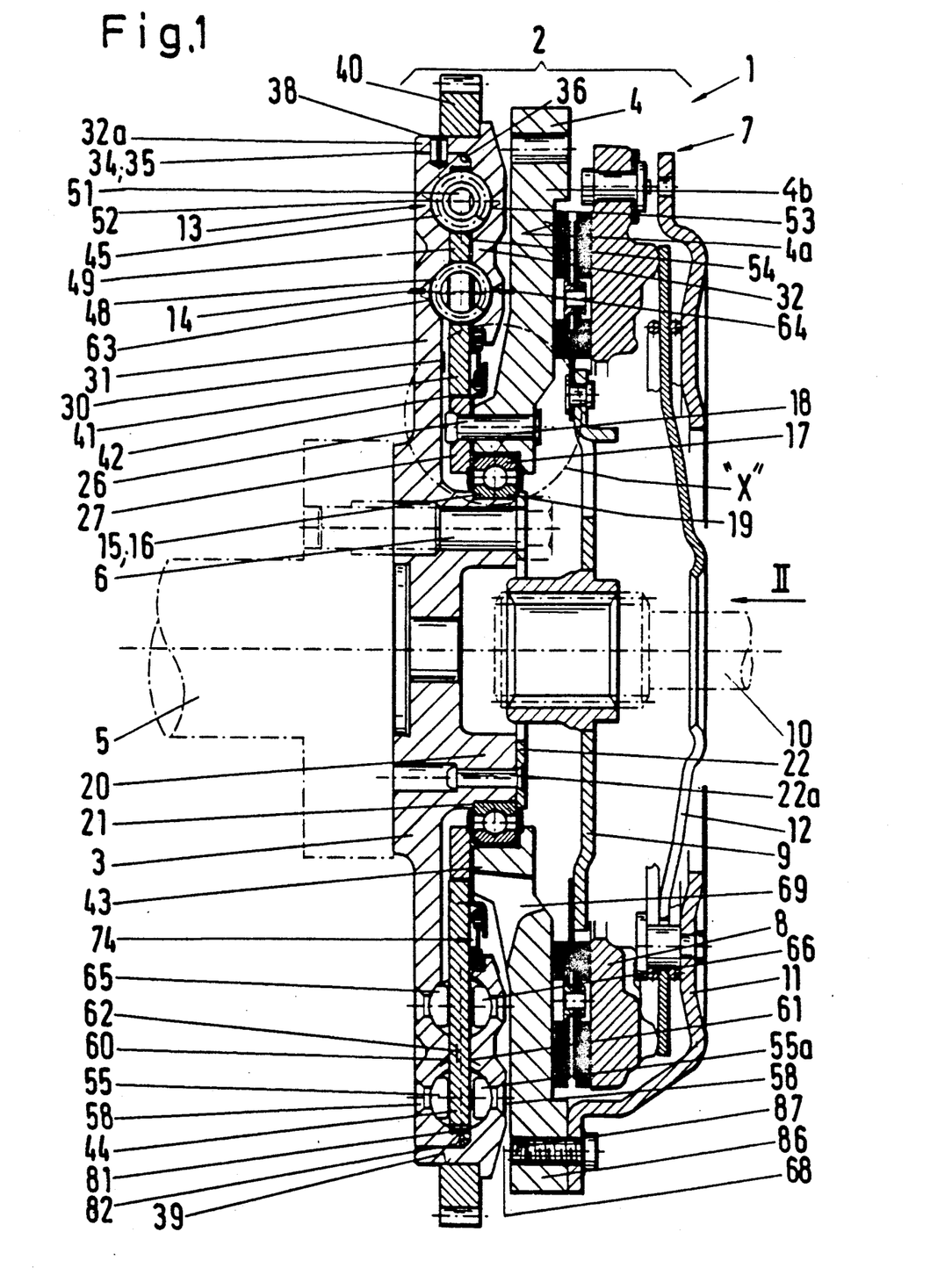
FIG. 1 is an axial sectional view of a vibration damping apparatus which embodies one form of the invention.
Figure 1A:
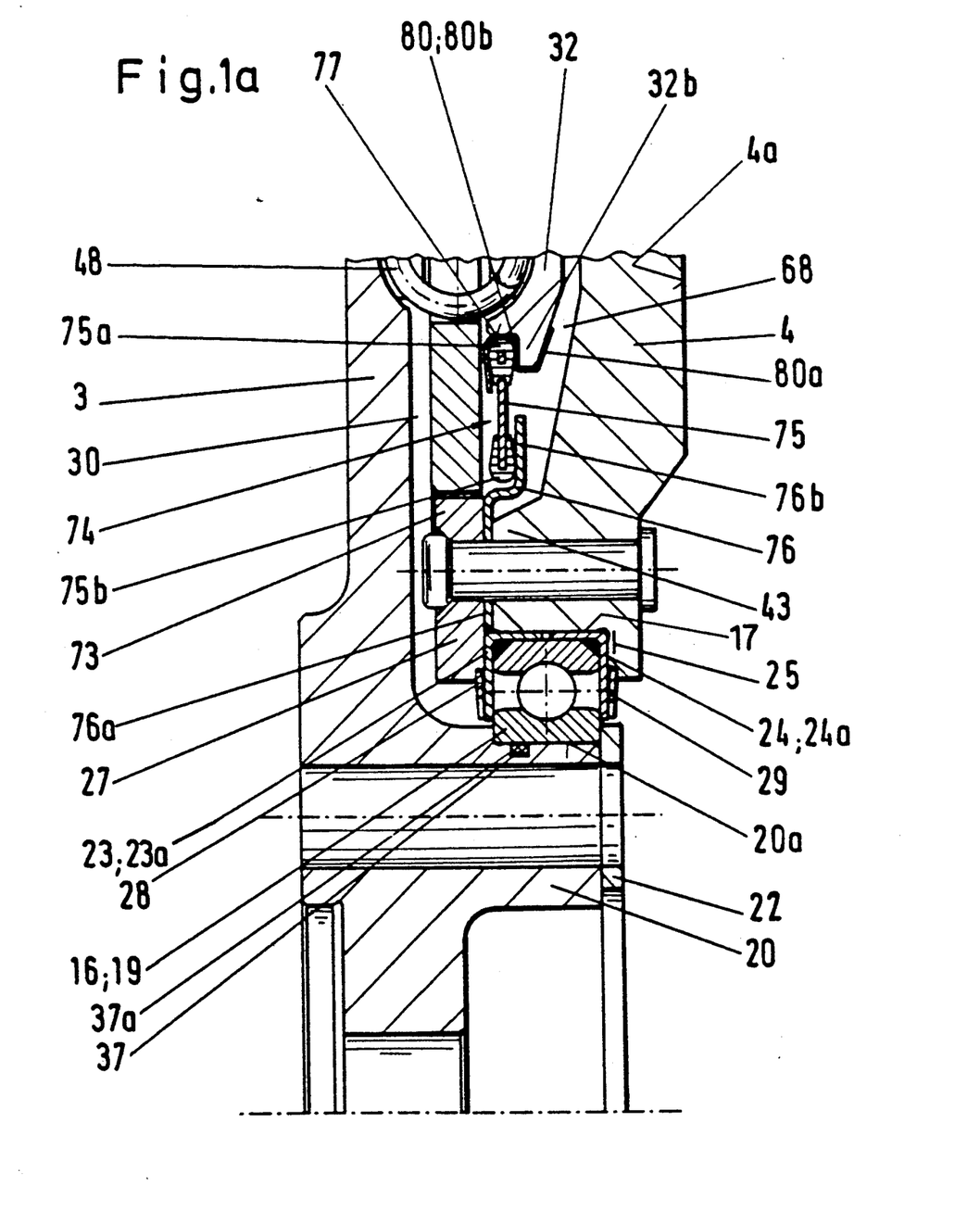
FIG. 1a is an enlarged view of a detail within the phantom-line circle "X" in FIG. 1.
Figure 2:
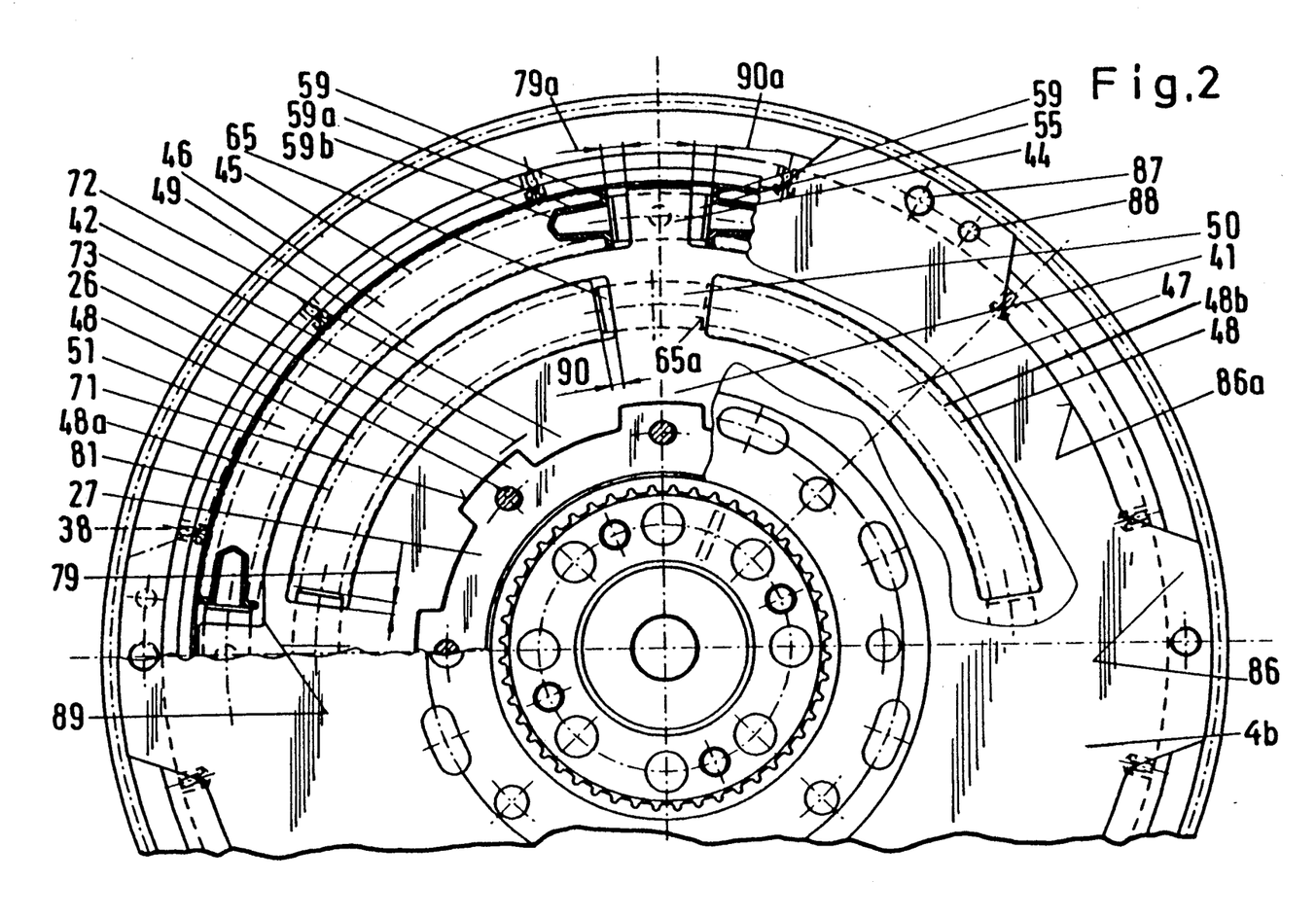
FIG. 2 is a fragmentary and elevational view as seen in the direction of arrow II in FIG. 1, with certain parts broken away.

Referring first to FIGS. 1, 1a and 2, there is shown an apparatus 1 which is utilized to damp torsional vibrations between the output element 5 (for example, a crankshaft) of an internal combustion engine and the input element 10 of a change-speed transmission in a motor vehicle. The apparatus 1 comprises a composite flywheel 2 which includes two coaxial components 3 and 4 (hereinafter called flywheels) which are rotatable relative to each other. The flywheel 3 is connected to the output element 5 of the engine by a set of bolts 6 or analogous fasteners, and the flywheel 4 is connectable with the input element 10 of the transmission by a friction clutch 7.

The friction clutch 7 comprises a pressure plate 8 which is movable axially toward and away from the friction surface 4a of the flywheel 4 and is coupled to this flywheel by a clutch cover 11. The means for biasing the pressure plate 8 axially toward the flywheel 4 comprises a diaphragm spring 12 which is tiltable between two ring-shaped seats at the inner side of the clutch cover 11 and normally maintains the pressure plate 8 in engagement with the adjacent set of friction linings at the respective side of a clutch plate or clutch disc 9 having a hub which is non-rotatably secured to the input element 10 of the transmission. The other set of friction linings on the clutch plate 9 is biased against the friction surface 4a of the flywheel 4 when the clutch 7 is engaged. The means (not shown) for disengaging the clutch 7 normally comprises an antifriction bearing which is movable axially in the direction of the arrow II against the radially inwardly extending prongs of the diaphragm spring 12 in order to change the conicity of the spring and to thereby enable the pressure plate 8 to move axially and away from the friction surface 4a of the flywheel 4. This enables the flywheel 4 to rotate independently of the clutch plate 9 and of the input element 10 of the transmission.

The means for yieldably opposing rotation of the flywheels 3 and 4 relative to each other comprises a first or outer damper 13 and a second or inner damper 14. These dampers are installed in an annular chamber 30 which is defined by a housing of the flywheel 3. The housing comprises a first radially extending section 31 which faces the output element 5 of the engine and a second section 32 which is disposed between the section 31 and the flywheel 4. The dampers 13 and 14 are connected in parallel.

A bearing unit 15 between the flywheels 3 and 4 comprises an antifriction bearing 16 with a single row of antifriction rolling elements in the form of spheres between an inner race 19 and an outer race 17. The outer race 17 is installed in an axial recess 18 of the flywheel 4, and the inner race 19 is mounted on an axial protuberance 20 which forms an integral part of the section 31 of the flywheel 3 and extends into the recess 18 of the flywheel 4. The protuberance 20 extends axially in a direction away from the output element 5 of the engine.

The peripheral surface of the protuberance 20 defines a cylindrical seat 20a (FIG. 1a) for the internal surface of the inner race 19. This inner race can be a press fit on the seat 20a of the protuberance 20 and abuts an annular shoulder 21 of the protuberance 20 under the action of a retaining ring 22 which is secured to the end face of the protuberance by a set of rivets 22a or analogous fasteners.

As best shown in FIG. 1a, the outer race 17 of the bearing 16 is held against axial movement relative to the flywheel 4 by a thermal barrier 25 which is interposed between the race 17 and the flywheel 4 and is held in the illustrated axial position by a disc-shaped member 27 (hereinafter called disc) which is secured to a projection or extension 43 of the flywheel 4 by a set of rivets 26. The thermal barrier 25 comprises two mirror symmetrical rings 23, 24 each of which has a substantially L-shaped cross-sectional outline. The axially extending portions of the rings 23, 24 are disposed between the periphery of the outer race 17 and the surface bounding the recess 18 in the projection 43 of the flywheel 4. The radially extending portion 24a of the ring 24 is adjacent the right-hand end face of the race 17 and projects inwardly across the space between the races 17, 19 and into abutment with the right-hand end face of the inner race 19 of the bearing 16. The portion 24a constitutes a sealing element which prevents escape of lubricant (such as grease) from the space between the races 17 and 19. The apparatus 1 comprises a resilient element 29 in the form of a diaphragm spring which reacts against an internal shoulder of the projection 43 and bears against the radially innermost part of the radially inwardly extending portion 24a of the ring 24 in order to insure the establishment of a desirable sealing engagement between the portion 24a and the adjacent end face of the inner race 19. Analogously, the radially inwardly extending portion 23a of the ring 23 constitutes a sealing element which extends across the space between the races 17, 19 and abuts the left-hand end face of the race 19. A resilient element 28 in the form of a diaphragm spring reacts against an internal shoulder of the disc 27 and biases the innermost part of the radially inwardly extending ring portion 23a into sealing engagement with the left-hand end face of the inner race 19. The sealing element or ring portion 23a seals the radially innermost portion of the annular chamber 30 from the space between the races 17, 19 of the antifriction bearing 16.

The purpose of the thermal barrier 25 is to reduce the rate of heat transfer from the friction surface 4a of the flywheel 4 to the lubricant between the races 17, 19 of the bearing 16 as well as to reduce the likelihood of excessive heating of the supply of viscous fluid medium which is confined in the chamber 30 of the flywheel 3.

The seat 20a on the protuberance 20 of the flywheel 3 is provided with a circumferential groove 37a for a sealing element 37 in the form of an O-ring or the like. Such sealing element is deformed when the inner race 19 engages its seat 20a on the protuberance 20 so as to reduce the likelihood of leakage of viscous fluid medium from the chamber 30 along the peripheral surface of the protuberance 20.

The sections 31 and 32 of the housing, which forms part of or constitutes the flywheel 3 and defines the chamber 30 for the dampers 13 and 14, are preferably castings. The section 32 comprises a cylindrical portion 32a which surrounds the periphery of the section 31. The internal surface 35 of the cylindrical portion 32a abuts and centers the cylindrical peripheral surface 34 of the section 31. The means for preventing axial movements of the sections 31 and 32 relative to each other comprises a set of radially extending pins 38 (such as so-called heavy type dowel pins) which are received in aligned radial holes or bores machined into the cylindrical portion 32a and into the adjacent radially outermost portion of the section 31. Such holes or bores extend across the cylindrical surfaces 34 and 35. The radially outermost portions of the pins 38 are held against expulsion from the respective holes or bores by the internal surface of a ring-shaped starter gear 40 which is slipped onto a cylindrical peripheral surface 39 of the cylindrical portion 32a of the section 32. The gear 40 can be held against axial and/or any other movement relative to the section 32 by spots of welding or in any other suitable way, not specifically shown in the drawing.

A sealing ring 36 (for example, an O-ring) is installed in a recess or groove which is provided therefor in the cylindrical peripheral surface 34 of the section 31 inwardly of the set of pins 38. The sealing element 36 is deformed and sealingly engages the cylindrical surfaces 34 and 35 when the sections 31 and 32 are properly assembled with each other. The purpose of the sealing element 36 is to prevent the viscous fluid medium from leaking beyond the radially outermost portion of the chamber 30 between the sections 31 and 32.

If it is desired to use a low-inertia flywheel 3, at least one of the sections 31, 32 can be made of a light metal, such as a suitable aluminum alloy. An advantage of light-metal sections is that they can be produced by application of pressure in a suitable press and require a minimum of or no secondary treatment.

The dampers 13 and 14 comprise a common output member 41 in the form of a substantially disc-shaped flange which is disposed axially between the sections 31 and 32 of the housing defining the chamber 30. As can be seen in FIG. 2, the radially innermost portion of the flange 41 is connected with and can transmit torque to or receive torque from the disc 27 by way of a connection or coupling 42 which enables the disc 27 and the flange 41 to move axially relative to each other. As mentioned above, the disc 27 is non-rotatably secured to the end face of the projection 43 of the flywheel 4 by a set of rivets 26.

The periphery of the flange 41 is provided with radially outwardly extending projections in the form of arms 44 which alternate with energy storing elements in the form of coil springs 45 forming part of the outer damper 13 and installed in an annular compartment 51 constituting the radially outermost portion of the chamber 30. The arms 44 alternate with elongated arcuate cutouts 46 for the coil springs 45. The cutouts 46 are disposed radially outwardly of arcuate windows 47 for energy storing elements in the form of coil springs 48 forming part of the inner damper 14. The cutouts 46 are separated from the respective windows 47 by elongated arcuate ribs or webs 49 which are integral parts of the flange 41 and extend between radially extending webs 50 between the windows 47. The webs 50 are functional equivalents of the arms 44 in that they constitute abutments for the adjacent end portions of coil springs 48 in the windows 47. The arms 44 extend into the compartment 51 of the chamber 30. This compartment is formed by two arcuate grooves 52, 53 which are provided in the internal surfaces of the sections 31, 32 and receive portions of the coil springs 45, namely those portions of the coil springs which extend axially of the composite flywheel 2 beyond the respective sides of the flange 41. The radially innermost portion of the compartment 51 is substantially sealed by the ribs 49 of the flange 41 save for a relatively narrow clearance or gap 54 constituting a flow restricting passage for viscous fluid medium which tends to flow into or out of the compartment 51.

As can be seen in FIG. 1, the surfaces bounding the grooves 52, 53 in the sections 31, 32 of the flywheel 3 are configured in such a way that they closely follow the outlines of the adjacent coil springs 45. This enables the surfaces bounding the grooves 52, 53 to properly guide the coil springs 45 when these springs are caused to expand or contract and slide relative to the sections 31 and 32. Relatively large areas of contact between the convolutions of the coil springs 45 and the sections 31, 32 are desirable and advantageous because this reduces pronounced localized wear upon the sections 31, 32 as well as upon the coil springs 45.

Maximum wear upon the convolutions of the coil springs 45 and upon the sections 31, 32 is likely to take place between the radially outermost portions of the springs 45 and the flywheel 3. This is due to the fact that friction between the coil springs 45 and the sections 31, 32 increases proportionally with rotational speed of the flywheel 3 because the magnitude of centrifugal force acting upon the coil springs 45 and tending to bias their convolutions against the radially outermost portions of surfaces bounding the grooves 52, 53 increases with increasing rotational speed. In order to reduce such wear, the flywheel 3 preferably comprises a strip- or band-shaped member 81 which can be made of a hard metallic material and is received in a shallow recess 82 forming the outermost part of the compartment 51. The illustrated member 81 is a short cylinder which is in contact with the radially outermost portions of convolutions of the coil springs 45, at least when the composite flywheel 2 is driven by the output element 5 or by the input element 10. The member 81 can be made of hardened steel or, alternatively, at least the internal cylindrical surface of this member can be treated so as to exhibit a pronounced hardness.

The means for moving those convolutions of the coil springs 45 which are remote from the respective arms 44 relative to the flange 41 in response to angular displacement of the flange 41 and the flywheel 3 relative to each other comprises abutments or stops 55, 55a which are installed in the grooves 52, 53 of the respective sections 31, 32 and are secured to the respective sections by rivets 58. The abutments 55, 55a can constitute forged or otherwise shaped (for example, stamped) parts which are produced separately and are secured in selected positions within the respective grooves 52, 53 by the rivets 58. It is preferred to flatten those surfaces of the abutments 55, 55a which come into actual contact with the adjacent end convolutions of the coil springs 45.

FIG. 2 shows that the length of the abutments 55, 55a exceeds the length or width of arms 44 on the flange 41, as seen in the circumferential direction of the flywheel 3. The flywheels 3 and 4 are shown in their neutral positions in which the arms 44 are located substantially midway between the respective abutments 55 and 55a. In other words, the abutment at one side of an arm 44 projects beyond such arm to the same extent as the abutment at the other side of the same arm.

The sections 31, 32 have internal surfaces which are provided with the aforementioned grooves 52, 53 and which include circumferentially complete portions 60, 61 flanking the ribs 49 of the flange and defining a circular passage 62. The width of the passage 62 exceeds only slightly the thickness of the flange 41 so that the width of the aforementioned clearance or gap 54 (part of the passage 62) is rather small. This gap can be provided between the flange 41 and one of the sections 31, 32 or the gap can comprise two portions, one between the flange 41 and the surface portion 60 and the other between the flange 41 and the surface portion 61.

The internal surfaces of the sections 31, 32 are provided with additional arcuate grooves 63, 64 which are disposed radially inwardly of the passage 62 and receive portions of the coil springs 48 which form part of the inner damper 14. These grooves receive those portions of the coil springs 48 which extend axially of the composite flywheel 2 beyond the respective sides of the flange 41. As shown in FIG. 1, the configuration of surfaces bounding the grooves 63 and 64 is such that these surfaces conform closely to the outlines of the adjacent convolutions of the coil springs 48. This ensures that the sections 31, 32 can properly guide the coil springs 48 during expansion or contraction. It is particularly desirable that the coil springs 48 (as well as the coil springs 45) be properly guided against buckling in the axial direction of the flywheel 3.

Each of the grooves 52, 53, 63, 64 is preferably a circumferentially complete groove. This is desirable because it is simpler to form or to finish the surfaces bounding such grooves. For example, the grooves 52, 53, 63, 64 can be formed in the course of the casting operation. It is then merely necessary to finish the surfaces bounding such grooves prior to insertion of the corresponding coil springs 45 and 48. Alternatively, the grooves 52, 53 and 63, 64 can be machined into flat internal surfaces of the respective sections 31 and 32.

Abutments 65, 66 for the coil springs 48 in the grooves 63, 64 are secured to the respective sections 31 and 32 by rivets corresponding to the rivets 58 for the abutments 55, 55a in the grooves 52 and 53. Each coil spring 48 is mounted between a web 50 of the flange 41 and two abutments 65, 66. Analogously, each coil spring 45 is mounted between an arm 44 and a pair of abutments 55, 55a. The length of the abutments 65, 66 in the circumferential direction of the flywheel 3 exceeds the length or width of the respective webs 50. However, and as shown in FIG. 2, the abutments 65 are offset from the respective sides of the adjacent webs 50 while the abutments 66 are not. This results in a subdivision of the coil springs 48 into a first group 48a and a second group 48b. Moreover, the offset of abutments 65, 66 with respect to successive webs 50 is different (refer to FIG. 2). In other words, a first abutment 65 is more distant from the adjacent web 50 than the corresponding abutment 66 but the next abutment 66 is more distant from the adjacent web 50 than the corresponding abutment 65. This also contributes to subdivision of coil springs 48 into the aforementioned groups 48a and 48b forming part of the inner damper 14.

The ribs 49 of the flange 41 are sufficiently close to the radially outermost portions of the convolutions of coil springs 48 that they are actually contacted by such convolutions when the flywheel 3 is driven by the engine or by the input element 10 of the transmission. In other words, the ribs 49 perform the function of the aforediscussed cylindrical member 81 for the radially outermost portions of convolutions of the coil springs 45.

It is presently preferred to make the flange 41 of steel which is at least surface-hardened so as to ensure that the flange can stand long periods of use. Adequate hardening is particularly desirable in regions of the internal surfaces of the webs 49 because such internal surfaces are contacted by the coil springs 48 when the flywheel 3 is rotated.

FIG. 2 shows that the arms 44 and abutments 55, 55a engage the respective end portions of coil springs 45 through the medium of cup-shaped spring retainers 59 each of which has a conical extension or stub 59a actually extending into the adjacent end portion of the respective coil spring 45 and having a conical or roof-shaped tip 59b. The peripheral surfaces of the spring retainers 59 are preferably closely adjacent the neighboring portions of surfaces bounding the grooves 52, 53 in the sections 31, 32. This enables the spring retainers 59 to act not unlike plungers or pistons which displace the viscous fluid medium in the compartment 51 in response to movement to abutments 55, 55a relative to the flange 41 and/or vice versa. The frustoconical extensions 59a of the spring retainers 59 can be replaced with substantially spherical extensions without departing from the spirit of the invention. The purpose of such extensions is to ensure that they automatically find their way into the adjacent end portions of the convolutions of coil springs 45 after the coil springs become separated from the respective retainers 59 and thereupon expand so as to move their end convolutions toward the adjacent arms 44 or toward the adjacent abutments 55, 55a. Proper reintroduction of extensions 59a into the adjacent end portions of the coil springs 45 is desirable and advantageous because this reduces the likelihood of damage to the coil springs. Expulsion of the extensions 59a from the adjacent end portions of coil springs 45 can take place when the coil springs 45 are subjected to pronounced compression and the flywheel 3 is driven at a high speed so that the centrifugal force urges the convolutions of compressed coil springs 45 against the internal surface of the cylindrical member 81 with such force that the expansion of the coil springs 45 is delayed, even when the coil springs are free to expand toward actual engagement with the respective spring retainers 59. Thus, when the flywheel 3 is driven at a high speed and the compressive force upon the coil springs 45 is abruptly relaxed, the coil springs 45 often tend to dwell in compressed condition for a certain interval of time, for example, until the RPM of the flywheel 3 is reduced to a threshold value, before they expand again and the extensions 59a of the respective retainers 59 automatically reenter the end portions of the neighboring coil springs. An additional ground for disengagement of the end portions of coil springs 45 from the respective retainers 59 is that the viscous fluid medium in the compartment 51 may hold the retainers 59 against movement with the end convolutions of the respective coil springs or the fluid medium can hold the coil springs 45 against immediate reengagement with the corresponding retainers 59. Such disengagement will normally take place only in response to abrupt changes of load upon the coil springs 45. The fluid medium distributes itself uniformly in the compartment 51 under the action of centrifugal force, and such flow of fluid medium can also cause disengagement of the spring retainers 59 from the respective end portions of the coil springs 45.

Each of the four coil springs 45 preferably extends along an arc of at least approximately 78°. Each of the two inner coil springs 48 in the group 48b preferably extends along an arc of approximately 74° and, each of the two coil springs 48 in the group 48a preferably extends along an arc of approximately 68°. Thus, the outer coil springs 45 together extend along about 86% of a complete circle, and the inner coil springs 48 jointly extend along an arc which amounts to approximately 79% of a complete circle. Such situation exists when the flywheels 3 and 4 are held in the neutral positions of FIG. 2.

The coil springs 45 and 48 are or can be straight prior to installation in the respective grooves of the sections 31 and 32. This means that each coil spring must be bent during insertion into the chamber 30 which can or could result in the development of reasonably large internal stresses. Therefore, it is often desirable to impart to the coil springs 45 and/or 48 an arcuate shape prior to insertion into the respective pairs of grooves 52, 53 and 63, 64. The bending may but need not be such that the coil springs 45 and/or 48 fit into the respective pairs of grooves without any additional bending. The installation of bent coil springs 45, 48 is simpler than if these springs were straight prior to insertion between the sections 31 and 32 of the flywheel 3.

The viscous fluid medium in the chamber is preferably a lubricant of pasty consistency, such as a silicon oil or grease. The quantity of fluid medium in the chamber 30 can be selected in such a way that, when the apparatus 1 is driven, the fluid medium forms in the compartment 51 a ring having an internal surface located at a constant distance from the axis of the flywheel 3 and filling the compartment at least to the level of the axes of the coil springs 45. However, it is normally preferred to completely fill at least the compartment 51 and to further insure that the clearance 54 is also filled with fluid medium as well as that the fluid medium also extends into that portion of the chamber 30 which is located radially inwardly of the passage 62 so that at least the outermost portions of the convolutions of coil springs 48 are in contact with the fluid medium when the apparatus 1 is driven. This ensures adequate lubrication of the coil springs 45, surfaces bounding the ribs 49, cylindrical member 81 and coil springs 48. In accordance with a presently preferred embodiment, the supply of viscous fluid medium in the chamber 30 is selected in such a way that, when the apparatus 1 is driven, the fluid medium forms a ring having an internal surface at the level of the axes of the coil springs 48 in the grooves 63, 64 of the sections 31, 32.

While it is also possible or conceivable to provide the chamber 30 in the flywheel 4, it is presently preferred to provide such chamber in the flywheel 3, i.e., in the flywheel which is nearer to the output element 5 of the engine and is more distant from the friction surface 4a of the flywheel 4 where substantial amounts of heat are likely to develop when the friction clutch 7 is being engaged or disengaged. Such arrangement ensures that the supply of viscous fluid medium in the chamber 30 is not unduly affected by heat which is generated by the friction clutch 7.

Additional heat is removed due to the provision of a radially extending ventilating channel 68 which is located between the section 32 of the flywheel 3 and the adjacent side of the flywheel 4. The radially outermost portion of the channel 68 is open to the atmosphere, and the radially innermost portion of this channel communicates with one or more axially and radially and/or axially and circumferentially extending passages 69 which are machined into or are otherwise formed in the flywheel 4 radially inwardly of the friction surface 4a and radially inwardly of a composite sealing means 74 between the chamber 30 and the channel 68.

FIG. 2 shows that the flange 41 has a central opening 71 which is bounded by a set of radially inwardly extending tooth-shaped projections 72 (first coupling device) forming part of the aforementioned coupling or connection 42. The projections 72 alternate with complementary projections 73 (second coupling device) which are provided at the periphery of the disc 27 and also form part of the coupling 42. The projections 72 can transmit torque to the projections 73 and vice versa. The coupling or connection 42 allows for proper orientation of the flange 41 relative to and between the sections 31, 32 of the flywheel 3 and render it possible to keep the width of the gap 54 (portion of the passage 62) to a minimum. Moreover, the connection or coupling 42 renders it possible to operate with reasonably large tolerances, i.e., it is not necessary to machine all of the parts in the region of the connection 42 with a very high degree of precision.

Referring to FIG. 1a, the sealing means 74 between the chamber 30 and the ventilating channel 68 comprises a first sealing device or member 75 which is carried by the radially innermost portion 32b of the section 32, and a second sealing member or insert 76 which is attached to the flange 4 in that it is clamped between the extension or projection 43 and the disc 27. The sealing device or member 75 is a disc-shaped body which is elastic in the axial direction and is installed in prestressed condition so that its radially innermost portion or inner marginal portion 75b bears against the dished outer marginal portion 76b of the sealing device or insert 76. When properly installed, the sealing device 75 resembles and acts not unlike a diaphragm spring which reacts against the innermost portion 32b of the section 32 and bears against the marginal portion 76b of the insert 76. The inner marginal portion 76a of the sealing device or insert 76 is disposed between the left-hand end face of the projection 43 and the disc 27 and is clamped by the rivets 26 which secure the disc 27 to the flywheel 4. The marginal portions 75a and 75b of the sealing device 75 constitute coats or layers of a suitable synthetic plastic material which can be sprayed onto the respective portions of the washer-like main portion of the sealing device 75. The material of the layers or coats 75a and 75b can have a lower coefficient of friction than the remaining main portion of the sealing device 75. Moreover, the material of the layers 75a and 75b can exhibit a certain amount of plasticity or elasticity. The means for securing the outer marginal portion of the sealing device 75 to the innermost portion 32b of the section 32 comprises a ring-shaped carrier 80 which extends in part into a ring-shaped notch 77 of the section 32 and which further comprises a collar 80a overlying the right-hand side of the innermost portion 32b. The reference character 80b denotes that portion of the carrier 80 which constitutes a socket for the outer marginal portion 75a of the sealing device 75 and is received in the ring-shaped notch 77 of the innermost portion 32b. The outer marginal portion 75a of the sealing device 75 can be tilted in the socket 80b so that the conicity of the sealing device 75 can be changed in response to engagement with the outer marginal portion 76b of the insert 76 during connection of the components or flywheels 3 and 4 to each other. The dished outer marginal portion 76b of the sealing device or insert 76 is offset in the axial direction of the flywheel 3 and in a direction away from the section 31 and flange 41.

In order to facilitate convenient assembly of the flywheels 3 and 4 of the composite flywheel 2, the inner diameter of the sealing device 75 exceeds the outer diameter of the annulus of tooth-like projections 73 at the periphery of the disc 27. In addition, the outer marginal portion 76b of the sealing device or insert 76 has an outer diameter exceeding the outer diameter of the annulus of projections 73.

The connection or coupling 42 and the sealing means 74 including the sealing devices 75 and 76 allow for a simple and convenient assembly of the apparatus 1. This is achieved in that the constituents of the apparatus 1 are combined into two subassemblies, one of which includes the flywheel 3 and the other of which includes the flywheel 4, before such subassemblies are connected to each other by the ring-shaped retainer 22, i.e., before the retainer 22 is riveted, bolted or otherwise affixed to the end face of the axial protuberance 20 on the flywheel 3. The arrangement is preferably such that the sealing device 75 is first mounted on the flywheel 3 and the antifriction bearing 16 is first mounted in the recess 18 of the flywheel 4. When the two subassemblies are in the process of being connected to each other, the inner race 19 of the bearing 16 is slipped onto the seat 20a at the periphery of the protuberance 20 of the flywheel 3 (i.e., of the section 31) and the projections 73 of the disc 27 are brought into mesh with the projections 72 of the flange 41 which is already installed between the sections 31 and 32. The radially innermost portion or inner marginal portion 75b of the sealing device 75 then engages the outer marginal portion 76b of the insert or sealing device 76 which latter is already affixed to the projection or extension 43 of the flywheel 4. The outer marginal portion 76b causes the sealing device 75 to store energy and to thus ensure the establishment of a reliable seal between the chamber 30 and the ventilating channel 68. The actual fixing of the flywheels 3 and 4 in optimum axial positions relative to each other is effected by the ring-shaped retainer 22.

The amount of wear upon the convolutions 45 and 48 on the one hand and the surfaces bounding the respective grooves 52, 53 and 63, 64 on the other hand can be reduced still further by coating selected portions of the sections 31, 32 with a highly wear-resistant material or by hardening the surfaces bounding these grooves. The hardening operation can involve an inductive, insert, laser or flame hardening of any known type. Coating with a wear-resistant material is desirable and advantageous if the wear upon the surfaces bounding the grooves 52, 53 and 63, 64 is expected to be very pronounced. Such coating can be affected by chemical nickel plating, by applying coats of chromium or by applying coats of molybdenum or a suitable wear-resistant synthetic plastic material. The applied coat or coats can be subjected to a smoothing treatment so as to enhance the finish of the surfaces where the sections 31 and 32 come into contact with the coil springs 45 and/or 48. A suitable smoothing operation can be carried out in a grinding or milling machine.

The mode of operation of the apparatus 1 is as follows:

When the flywheel 4 is caused to change its angular position with reference to the flywheel 3 from the neutral position which is shown in FIG. 2, the flange 41 is turned by the torque-transmitting connection or coupling 42 so that the webs 50 first cause the coil springs 48 of the group 48b and cause such springs to store energy. This is effected by the webs 50 in conjunction with the corresponding abutments or stops 65, 66. When the flywheel 4 completes an angle 79 (shown in the left-hand portion of FIG. 2) in one direction of rotation or the angle 90 in the other direction of rotation, the webs 50 of the flange 41 engage the ends of coil springs 48 of the group 48a so that, if the flywheel 4 continues to turn relative to the flywheel 3, the coil springs 48 of the group 48a also store energy jointly with the coil springs 48 of the group 48b. When the flywheel 4 completes the angle 79a in one direction of rotation or the angle 90a in the other direction of rotation, the arms 44 of the flange 41 begin to deform the coil springs 45 so that, if the flywheel 4 continues to turn relative to the flywheel 3, the arms 44 cooperate with the respective abutments 55, 55a to cause the coil springs 45 to store energy.

In the embodiment of FIGS. 1, 1a and 2, the angle 79 matches the angle 79a and the angle 90 equals the angle 90a so that the coil springs 48 of the group 48a are compressed jointly with the coil springs 45. In other words, the composite damper 13, 14 of the apparatus 1 has a two-stage characteristic curve. However, it is also possible to have the angles 79, 90 only partially overlap the angles 79a, 90a or such angles can be entirely different so that the damper means 13, 14 will have a three-stage damping characteristic in both directions or at least a two-stage characteristic in one direction and at least a three-stage characteristic in the other direction of rotation.

Furthermore, and as shown in FIG. 2 at 65a by broken lines, the abutments 65, 66 can be recessed with reference to the adjacent end portions of the coil springs 48 in the group 48b so that no storing of energy will take place immediately after the flywheel 4 leaves the neutral position of FIG. 2. At such time, the movements of the flywheel 4 relative to the flywheel 3 and/or vice versa are damped only hydraulically (i.e., by viscous fluid medium in the chamber 30) and/or by relying on a purely mechanical damping action.

In the illustrated embodiment, joint compression of coil springs 48 in the groups 48a and 48b as well as of the coil springs 45 continues at least until at least one coil spring 48 of the group 48a cannot undergo any additional compression, namely when at least one of these springs resembles a solid block as seen in the circumferential direction of the flywheel 3. This limits the extent of angular displacement of the flywheels 3 and 4 relative to each other.

Frictional damping action takes place when the flywheel 3 and/or 4 turns relative to the other flywheel due to frictional engagement between the coil springs 45 and the surfaces bounding the grooves 52, 53 as well as due to frictional engagement between the coil springs 45 and the cylindrical member 81. Additional frictional engagement takes place between the sealing device 75 and the outer marginal portion 76b of the sealing device 76. Mechanical friction develops between the coil springs 48 of the inner damper 14 and the surfaces bounding the respective grooves 63, 64. The mechanical damping action which is due to friction between the coil springs 45, 48 on the one hand and the member 81 and ribs 49 on the other hand is a function of the rotational speed of the apparatus 1, i.e., the friction-induced damping action increases with increasing rotational speed.

Additional damping action is generated by the fluid medium in the chamber 30 as a result of turbulence which is produced by the convolutions of the coil springs 45, 48 and also by the arms 44 and webs 50. The hydraulic or viscous damping action of the fluid medium is particularly pronounced in the annular compartment 51 because such compartment is practically sealed from the radially innermost portion of the chamber 30 so that the fluid medium must pass through the narrow gap 54 if it is to leave or enter the compartment 51. The expulsion of fluid medium from the compartment 51 into and inwardly beyond the gap 54 takes place primarily under the action of spring retainers 59 which act not unlike pistons or plungers as soon as the flywheel 4 turns relative to the flywheel 3 and/or vice versa. When the coil springs 45 are caused to store energy, the retainers 59 on the arms 44 advance toward the retainers 59 on the abutments 55, 55a so that the fluid medium which is confined between and within the convolutions of the coil springs 45 is forced mainly radially inwardly and into the respective portions of the gap 54 and flows into the compartment which is defined in part by the grooves 63, 64 of the sections 31 and 32. The parts 41, 31, 32 which define the gap 54 act not unlike a flow restrictor and strongly oppose any flow of fluid medium from the compartment 51.

Some additional fluid medium is displaced in the compartment 51 itself by flowing around the peripheral surfaces of the spring retainers 59.

The displaced fluid medium thereupon immediately tends to redistribute itself in the compartment 51 and to fill this compartment as soon as possible when the coil springs 45 are free to expand whereby the parts which define the gap 54 again perform a desirable flow restricting action. The outward flow of fluid medium is due to the action of centrifugal force which tends to cover the mass of fluid medium into a ring having an internal surface at a constant distance from the axis of the flywheel 3. When the coil springs 45 expand, the fluid medium in the compartment 51 is again compelled to flow around the peripheries of the spring retainers 59 and this produces an additional desirable damping action. The damping action which is generated by the fluid medium is a function of the rotational speed of the apparatus 1 because such damping action increases with increasing rotational speed of the flywheel 3, i.e., with each intensification of centrifugal force which acts upon the confined fluid medium.

At least some viscous or hydraulic damping is also produced in the inner compartment including the grooves 63, 64 where the fluid medium is agitated and displaced by the coil springs 48 as well as by the webs 50 and, if provided, by spring retainers on the webs 50 and/or abutments 65, 66.

The damping action can be regulated in a number of different ways. For example, the damping action of the spring retainers 59 can be altered by providing the peripheral surfaces of these retainers with notches, grooves or otherwise configurated recesses as well as by providing one or more retainers 59 with holes or bores which need not extend all the way to their peripheral surfaces. Additional regulation of the damping action can be achieved by altering or by properly selecting the width of the gap 54. Still further, the damping action can be altered by reducing or by increasing the circumferential clearances between the peripheral surfaces of some or all of the spring retainers 59 and the adjacent internal surfaces of the sections 31 and 32. Moreover, one or more spring retainers 59 can be removed to thereby reduce the hydraulic or viscous damping action. Still further, one or more spring retainers can also be installed in the compartment including the grooves 63 and 64 to produce an additional desirable damping action.

FIG. 2 shows that the portion 4b of the flywheel. 4 has a set of radially outwardly extending projections 86 which alternate with recesses or tooth spaces 86a. The projections 86 are provided with tapped bores or holes 87 for reception of fasteners (one shown in FIG. 1) which secure the clutch cover 11 to the flywheel 4. Additional bores or holes 88 can be provided in the projections 86 for reception of pins (not shown) which serve to properly center the cover 11 of the friction clutch 7 with reference to the flywheel 4. The provision of recesses 86a contributes to a reduction of overall weight of the flywheel 4 if it is desirable to reduce the mass of this flywheel. Furthermore, the recesses 86a provide paths for the flow of atmospheric air which serves to cool the portion 4b of the flywheel 4 as well as the clutch 7 which is mounted on this flywheel. The currents of air which pass through the recesses 86a circulate between the flywheel 4 and the clutch cover 11. The provision of projections 86 renders it possible to increase the thickness of the flywheel 4 in the region of the friction surface 4a; this further reduces the likelihood of overheating the respective portion of the flywheel 4.

Additional regulation of damping action which is carried out by the viscous fluid medium can be achieved in that certain portions of the compartment 51 are widened, i.e., that their cross-sectional area is increased, so as to reduce the damping action in such regions. In other words, it is possible to reduce the damping action by providing selected regions of the compartment 51 with enlarged portions one of which is shown at 89 in the left-hand portion of FIG. 2. The transition between the enlarged portion or portions 89 and the adjacent portion or portions of the compartment 51 can be gradual or abrupt. Such enlarged portion or portions can be provided practically anywhere along the compartment 51. However, it is presently preferred to provide such enlarged portions in the regions of end portions of the coil springs 45 in uncompressed condition of such springs. This is shown in the left-hand portion of FIG. 2 wherein the enlarged portion 89 is adjacent one of the arms 44. The illustrated enlarged portion 89 is adjacent the innermost portions of adjacent convolutions of the coil spring 45 in the compartment 51. The enlarged portion 89 is provided in the adjacent web or rib 49 of the flange 41. However, it is clear that one or more enlarged portions can also be provided in the section 31 and/or 32 without departing from the spirit of the invention.

The viscous fluid medium can be introduced into the chamber 30 prior to attachment of the two subassemblies of the apparatus 1 to each other, i.e., prior to insertion of the protuberance 20 of the flywheel 3 into the inner race 19 of the bearing 16 in the recess 18 of the flywheel 4. The admission of at least some fluid medium into the chamber 30 prior to attachment of the flywheels 3, 4 to each other renders it possible to introduce the fluid medium through that portion of the chamber 30 (radially inwardly of the inner marginal portion 75b of the sealing device 75) which is open anyway prior to such attachment, i.e., prior to engagement of the inner marginal portion 75b with the outer marginal portion 76b of the sealing device or insert 76.

In order to admit and distribute the fluid medium in the chamber 30, the flywheel 3 is accelerated to a rotational speed sufficient to generate a centrifugal force which effects uniform distribution of fluid medium (particularly a highly viscous fluid medium of pasty consistency) in the chamber 30 so that the resulting ring of properly distributed fluid medium has an internal surface each portion of which is located at the same distance from the axis of the flywheel 3. The consistency of the fluid medium in the chamber 30 can be selected in such a way that the aforementioned ring of properly distributed fluid medium does not change its shape even if the speed of the flywheel 3 is reduced to zero. This preferably applies for the entire range of temperatures of the fluid medium in the chamber 30 when the apparatus 1 is in use. In other words, even if the viscosity of the fluid medium changes in response to heating or cooling within the temperature range which is anticipated while the apparatus 1 is in storage or is installed and used in a motor vehicle or the like, the viscosity does not or need not change to such an extent that the configuration of the ring of properly distributed fluid medium (such as a thick-flowing paste or grease) would change when the engine ceases to rotate the output element 5 or when the input element 10 ceases to rotate the flywheel 4. The just described selection of the consistency or characteristics of the fluid medium in the chamber 30 renders it possible to properly balance the assembled apparatus 1 upon completed balancing of the flywheel 4 and/or 3 (provided that a balancing of the apparatus is actually necessary).

The RPM at which the fluid medium is properly distributed in the chamber 30 is normally between 4000 and 7000, preferably between 5000 and 6000. The flywheel 3 can be balanced prior to assembly with the flywheel 4, and the flywheel 4 can be balanced in a separate operation independently of the flywheel 3. This means that, for all practical purposes, the apparatus is properly balanced as soon as the attachment of the flywheels 3 and 4 to each other is completed. However, it is equally within the purview of the invention to balance the fully assembled apparatus 1 prior to installation in the power train of a motor vehicle.

The making of two self-sustaining subassemblies prior to complete assembly of the apparatus 1 exhibits a number of important advantages. Thus, the mounting of sealing devices 75, 76 on the flywheels 3 and 4, respectively, is much simpler than the mounting of both such sealing devices on one and the same flywheel. Moreover, the sealing devices 75, 76 automatically seal the chamber 30 from the ventilating channel 68 when the assembly of the apparatus 1 is completed. The same applies for the mounting of the antifriction bearing 16, i.e., such mounting is simplified if the bearing is first installed in the recess 18 of the flywheel 4 before its inner race 19 is slipped onto the seat 20a of the protuberance 20. The advantages of the coupling or connection 42 (which becomes effective as soon as the inner race 19 of the bearing 16 is slipped onto the seat 20a) were pointed out above; this coupling is ready to transmit torque as soon as the projections 73 of the disc 27 mate with the projections 72 of the flange 41. The slipping of inner race 19 onto the seat 20a results in the establishment of a seal (between 75 and 76) for the inner portion of the chamber 30, in proper journalling of the projection 43 of the flywheel 4 on the protuberance 20 of the flywheel 3, and in the establishment of a torque-transmitting connection (at 42) between the disc 27 (flywheel 4) and the flange 41 (output member of the dampers 13, 14). The final assembling step merely involves the application of retaining ring 22 to hold the flywheels 3, 4 against axial movement relative to each other as well as to fix the antifriction bearing 16 in a selected axial position with reference to the protuberance 20.

Another important advantage of the making of two self-sustaining subassemblies is that it is rather simple to take the apparatus 1 apart in order to carry out necessary repairs or to replace certain parts (such as the sealing device 75 and/or 76 or the bearing 16).

The feature that the chamber 30 is defined by the sections 31, 32 of that flywheel (3) which is nearer to the output element 5 of the engine, that the flywheel 3 forms part of one of the subassemblies and that the flywheel 4 and the bearing 16 form part of the other subassembly contributes to longer useful life of the improved apparatus. This is due to the fact that the supply of viscous fluid medium in the chamber 30 is less likely to be affected by heat which is generated by the friction clutch 7 because the major part of heat which is generated at 4a is dissipated by the flywheel 4 and/or is led away by way of the channel 68 and passages 69. It has been found that the thermal effect of the friction clutch 7 upon the viscous fluid medium in the chamber 30 of the flywheel 3 is minimal or non-existent.

A further important advantage of the improved apparatus is that the sealing devices 75, 76 not only cooperate to seal the chamber 30 from the atmosphere but that they can also automatically seal the radially innermost portion of the ventilating channel 68 (save at 69) when the attachment of the flywheel 4 to the flywheel 3 is completed. The channel 68 preferably extends well toward and close to the common axis of the flywheels 3 and 4 so as to even further reduce the likelihood of transfer of substantial amounts of heat from the flywheel 4 to the section 32 of the housing for the chamber 30. The passages 69 are optional but they constitute a desirable feature of the flywheel 4 because they contribute to more rapid and reliable dissipation of heat which is generated by the friction clutch 7. The currents of air which circulate through the channel 68 due to the provision of passages 69 remove a large percentage of heat which, otherwise, could be transferred to the section 32 and to the supply of fluid medium in the chamber 30.

The apparatus 1 can be simplified by making the tooth-like projections 73 of the connection or coupling 42 integral parts of the projection 43, i.e., of the flywheel 4. The provision of projections 73 on a disc-shaped member (27) which is connectable to the flywheel 4 is preferred at this time, especially since the member 27 can further serve as a means for maintaining the inner marginal portion 76b of the sealing device 76 in sealing engagement with the projection 43 of the flywheel 4.

The lubricant for rolling elements of the antifriction bearing 16 can be confined between the races 17 and 19 in a number of ways. The thermal barrier 25 is preferred at this time because it is simple and compact and also because it can perform several functions including preventing the transfer of excessive quantities of heat to the fluid medium in the chamber 30 and of simultaneously confining lubricant between the races 17 and 19. The rings 23, 24 can be non-rotatably installed between the outer race 17 and the projection 43 of the flywheel 4, and their portions 23a, 24a can bear against the respective end faces of the inner race 19 due to their initial stress and/or due to the biasing action of the diaphragm springs 28, 29, respectively.

The provision of a seal between the lefthand end faces of the races 17 and 19 (as viewed in FIG. 1 or 1a) is desirable and advantageous if the lubricant which is confined between the races 17 and 19 should not mix with the fluid medium in the chamber 30. On the other hand, the diaphragm spring 28 and the radially innermost part of the ring portion 23a can be omitted if the lubricant in the bearing 16 is compatible with, or the same as, the fluid medium in the chamber 30. The lubricant for rolling elements in the bearing 16 will be different from the fluid medium in the chamber 30 if it is to perform certain specific functions which are not expected from or not desirable for the fluid medium in the chamber 30.

As can be seen in FIGS. 1 and 1a, the inner diameter of the sealing device 75 is larger than the outer diameter of the annulus of projections 73 on the disc 27. This renders it possible to slip the inner race 19 of the bearing 16 onto the seat 20a whereby the disc 27 bypasses the sealing device 75 and the latter is engaged only by the outer marginal portion 76b of the sealing device or insert 76 on the projection 43 of the flywheel 4. The flange 41 is mounted between the sections 31, 32 of the flywheel 3 before the two flywheels are connected to each other so that the projections 73 of the disc 27 begin to mesh with the teeth 72 around the central opening 71 of the flange 41 as soon as the flywheels 3 and 4 assume the axial positions which are shown in FIGS. 1 and 1a.

The sealing device 76 can be considered a component part of the flywheel 4, i.e., the inner marginal portion 75b of the sealing device 75 can be said to abut the flywheel 4 when the apparatus 1 is fully assembled. At such time, the outer marginal portion 75a of the sealing device 75 is sealingly received in the portion 80b of the carrier 80 and is biased into the socket which is defined by the portion 80b under the action of the leftmost portion of the carrier 80, as seen in FIG. 1a. The carrier 80 maintains the outer marginal portion 75a of the sealing device 75 in a predetermined axial position but the sealing device 75 is tilted by the dished outer marginal portion 76b of the sealing device 76 when the assembly of the apparatus 1 is completed; at such time, the sealing device 75 resembles a hollow conical frustum and acts not unlike a diaphragm spring. The outer diameter of the sealing device 76 must exceed the inner diameter of the sealing device 75. The utilization of a sealing device 76 with a dished outer marginal portion 76b is desirable because the portion 76b can resist deformation with a large force and can cause deformation (including tilting) of the sealing device 75 to thus establish a reliable seal between the inner marginal portion 75b and the outer marginal portion 76b.

Admission of at least some viscous fluid medium into the chamber 30 prior to attachment of the flywheel 4 to the flywheel 3 is desirable and advantageous for the aforediscussed reasons and also because it is easier to manipulate the flywheel 3 when the chamber 30 already contains a supply of properly distributed viscous fluid medium, especially a medium which remains in the radially outermost portion of the chamber 30 even if the flywheel 3 is brought to a halt. As mentioned above, at least some fluid medium can be admitted through the gap between the inner marginal portion 75b of the sealing device 75 and the adjacent side of the flange 41 (which is already confined between the sections 31 and 32) so that it is not necessary to provide one or more specially designed inlets for admission of the fluid medium. This obviates the need for the provision of one or more special closures (e.g., plugs or bungs) for the inlet or inlets.

As already pointed out above, the RPM of the flywheel 3 upon completed introduction of at least some fluid medium into the chamber 30 can vary within a wide range (4000-7000 RPM). All that counts is to ensure that the selected fluid medium will be properly distributed in the chamber 30. Such distribution of fluid medium in the chamber 30 takes place prior to balancing of the flywheel 3 (if a balancing is necessary at all). The RPM of the flywheel 3 during balancing can be much lower than the RPM during uniform distribution of fluid medium in the chamber 30 (namely a distribution such that the fluid medium forms a ring having a radially innermost portion each increment of which is located at the same distance from the axis of the flywheel 3). Such mode of treating the fluid medium in the chamber 30 and such mode of balancing the flywheel 3 ensure that the flywheel 3 can be balanced with a high degree of accuracy. Rotation of the flywheel 3 at a high speed during distribution of fluid medium in the chamber 30 ensures that the chamber 30 cannot contain any pockets of entrapped air which could affect the balance of the flywheel 3 upon completion of the distributing step. The magnitude of centrifugal force which acts upon the fluid medium in the chamber 30 is and should be sufficiently high to avoid the formation of pockets of entrapped air or any other gaseous fluid. It has been found that the aforementioned range of 4000-7000 RPM suffices to ensure the expulsion of all traces of gaseous fluid from the radially outermost portion of the chamber 30. The confined viscous fluid medium then prevents penetration of fresh air into the radially outermost portion of the flywheel 3, especially if it is of a pasty or like consistency and is not appreciably affected by changes in temperature within the range of temperatures which are expected when the improved apparatus 1 is in use. The RPM which is selected for the flywheel 3 during distribution of viscous fluid medium in the chamber 30 is preferably close to the maximum RPM of the engine which is to drive the flywheel 3 when the apparatus 1 is installed in the power train of a motor vehicle.

Separate balancing of the flywheels 3, 4 prior to balancing of the assembled apparatus 1 constitutes one presently preferred mode of balancing. Alternatively, such operation merely involves a balancing of the flywheel 3, of the flywheel 4, of the flywheels 3 and 4, or only of the assembled apparatus 1. Balancing involves addition of material to or removal of material from the part to be balanced while the part to be balanced is mounted in a machine which can drive it at one or more speeds.

Figure 3:
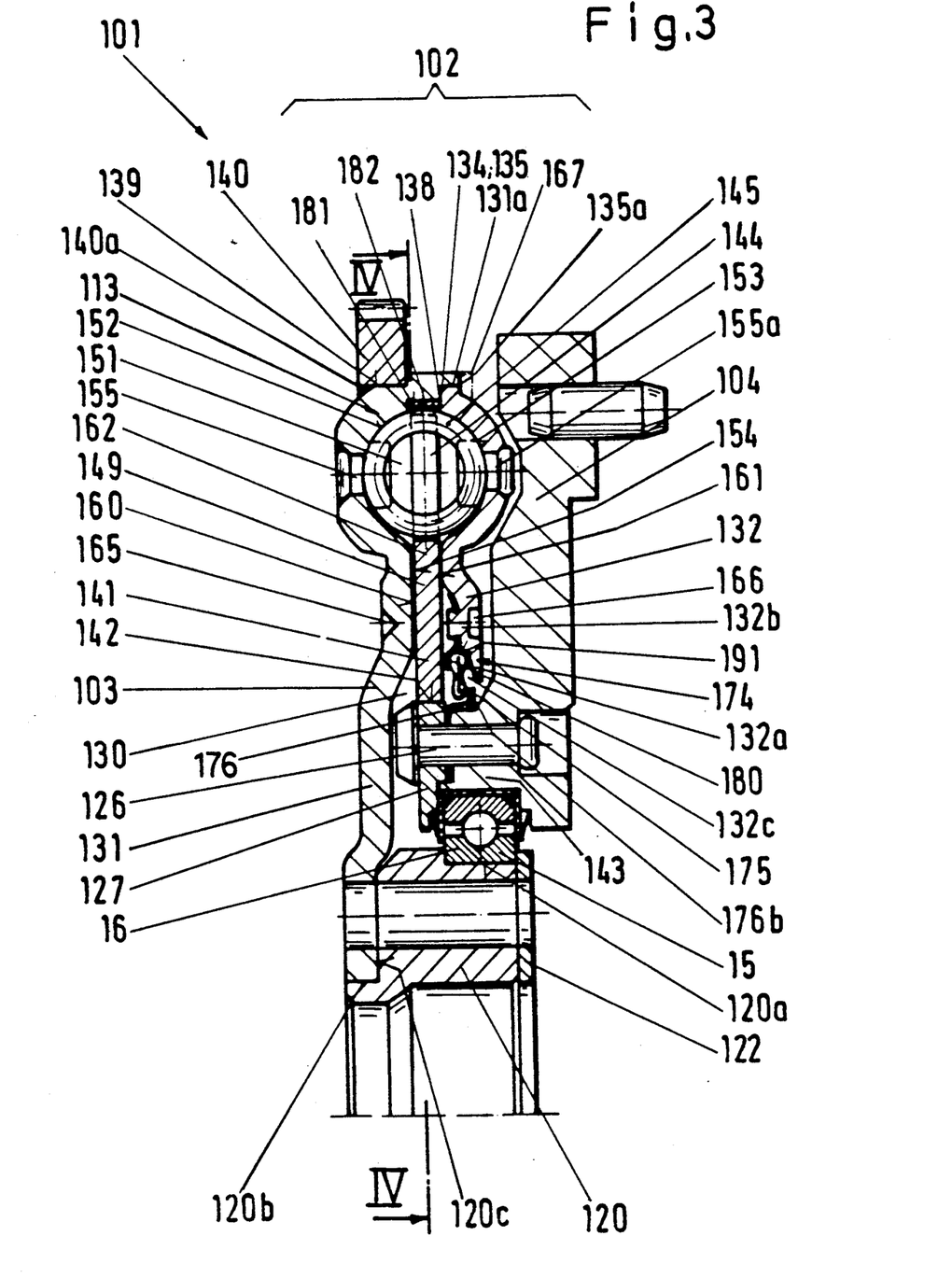
FIG. 3 is a fragmentary axial sectional view of a modified vibration damping apparatus, the section being taken along the line III—III of FIG. 4 as seen in the direction of arrows.
Figure 4:
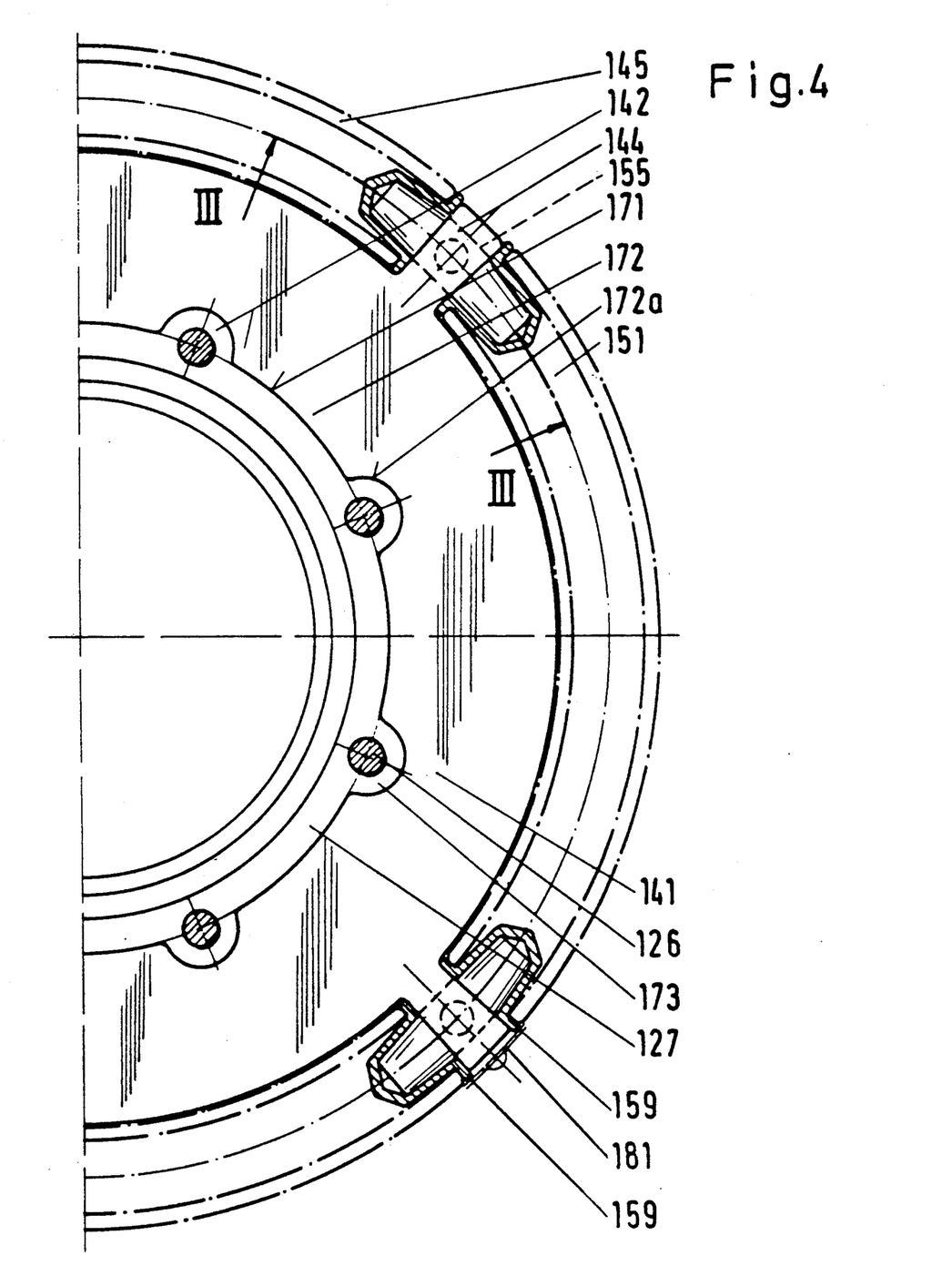
FIG. 4 is a sectional view substantially as seen in the direction of the arrows from the line IV—IV in FIG. 3.

FIGS. 3 and 4 show a second vibration damping apparatus 101 wherein all such parts which are identical with or clearly analogous to the corresponding parts of the apparatus 1 of FIGS. 1, 1a and 2 are denoted by similar reference characters plus 100. The composite flywheel 102 again comprises a plurality of coaxial components or flywheels including a first flywheel 103 which is or can be attached to the output element of an engine and a second flywheel 104 which is connectable with the input element of a change-speed transmission by way of a friction clutch corresponding to the friction clutch 7 of FIG. 1. The bearing unit 15 between the flywheels 103 and 104 comprises an antifriction ball bearing 16 with one row of spherical antifriction rolling elements. Such bearing can be replaced with any other suitable antifriction bearing or with two or even more discrete antifriction bearings.

The flywheel 103 includes a housing which defines an annular chamber 130 for a single damper 113 having a set of energy storing elements in the form of coil springs 145. The housing of the flywheel 103 includes two sections 131, 132 which are sealingly connected to each other radially outwardly of the chamber 130. Each of the sections 131, 132 is made of metallic sheet material and these sections are sealingly bonded to each other by a circumferentially complete welded seam 138 or by a set of discrete seams or spots. It is preferred to provide a welded seam 138 which also serves as a means for sealing the radially outermost portion of the chamber 130 from the surrounding atmosphere. One can resort to a resistance butt welding or to a capacitive discharge welding operation, i.e., to a welding technique which involves the application of low-voltage, high-amperage electric current to those portions of the sections 131 and 132 which must be welded to each other. Actual welding takes place in response to the application of pressure in the axial direction of the sections 131 and 132. The application of electric current results in heating of selected portions of the sections 131, 132 and the thus softened portions are joined to form the seam 138 in response to the application of axial pressure.

The sections 131, 132 are respectively provided with abutting radially extending annular surfaces 134, 135 having a predetermined area which is a function of the strength of electric current which is applied to form the welded seam 138. The seam 138 is formed as a result of bonding of the surfaces 134, 135 to each other.

The means for properly centering the section 132 of the flywheel 103 with reference to the section 131 in the radial direction of the flywheel comprises a cylindrical portion 131a which constitutes an axially extending annular wall of the section 131 and has a cylindrical internal centering surface abutting the cylindrical peripheral surface 135a of the section 132. The sections 131 and 132 are further maintained in predetermined angular positions with reference to each other while the welding operation is in progress; to this end, the outer sides or surfaces of the sections 131, 132 are respectively formed with axially parallel recesses or sockets 165, 166 which can receive the tips of prongs of welding equipment serving to bond the sections 131 and 132 to each other. The angular positions of prongs which enter the sockets 165 with reference to the prongs which enter the sockets 166 are known and are selected with a view to ensure that the angular positions of the sections 131, 132 will coincide with optimum angular positions not later than when the welding operation is completed.

The sections 131, 132 of the flywheel 103 tend to move toward each other during welding, i.e., during application of axial forces while the material of the sections in the regions of the surfaces 134 and 135 is soft as a result of heating to welding temperature. Therefore, the section 132 is or can be provided with one or more stops 167 (one shown by phantom lines in the upper portion of FIG. 3) which come into abutment with the adjacent radially extending end face of the cylindrical centering portion 131a of the section 131 in the course of the welding operation and thus prevent any further axial movement of the sections 131 and 132 toward each other. The stop or stops 167 render it possible to obtain a satisfactory welded seam 138 even if the characteristics of electric current which is applied to heat the sections 131, 132 to welding temperature along the surfaces 134 and 135 deviate from optimum characteristics, e.g., even if the strength of the current is higher than necessary. Moreover, it is not necessary to regulate the magnitude of axially applied forces with a very high degree of accuracy because the application of axial forces can be terminated as soon as the stop or stops 167 reach the end face of the cylindrical centering portion 131a.

The output member of the damper 113 is a radially extending flange-like element 141 (hereinafter called flange) which is disposed between the sections 131, 132 of the flywheel 103 and the radially innermost portion of which constitutes one part of a coupling 142 for the establishment of a torque-transmitting connection between the flange 141 and a disc 127 which is affixed to the flywheel 104 by a set of rivets 126. The rivets 126 secure the disc 127 to the end face of an axial projection or extension 143 of the flywheel 104. The radially outermost portion of the flange 141 has projections or arms 144 which are received in the chamber 130 and alternate with the coil springs 145 of the damper 113. These springs are installed in an annular compartment 151 which is part of the chamber 130 and is bounded by surfaces closely conforming to the exposed surfaces of convolutions of the coil springs 145. The major portion of the compartment 151 is defined by two arcuate grooves 152, 153 which are respectively provided in the internal surfaces of the sections 131, 132 and receive those portions of the coil springs 145 which extend axially of the apparatus 101 beyond the respective sides of the flange 141. The grooves 152, 153 are preferably formed during making of the sections 131, 132, i.e., during deformation of blanks of metallic material in a press or in a stamping or like machine.

The arms 144 of the flange 141 are outwardly adjacent an annular portion 149 which cooperates with the sections 131, 132 to nearly completely seal the compartment 151 from the chamber portion radially inwardly of the portion 149 save for the provision of one or two relatively narrow clearances or throttling gaps 154.

The surfaces bounding the grooves 152 and 153 serve to guide the convolutions of the coil springs 145 when these springs are caused to store or dissipate energy as a result of angular movement of the flange 141 relative to the sections 131, 132 and/or vice versa. The arrangement is preferably such that the convolutions of the coil springs 145 abut the surfaces bounding the grooves 152, 153 at least when the apparatus 101 is driven, i.e., when the coil springs 145 are acted upon by centrifugal force.

In order to reduce wear upon the sections 131, 132, the radially outermost portion of the compartment 151 constitutes a shallow recess 182 for a short cylindrical band- or strip-shaped member 181 which is made of hardened steel or is hardened only along its internal surface to withstand extensive wear as a result of repeated frictional engagement with the coil springs 145 when the apparatus 101 is driven to subject the coil springs to the action of centrifugal force.

The coil springs 145 are compressed by the arms 144 of the flange 141 in conjunction with pairs of abutments or stops 155, 155a which are provided in the respective grooves 152, 153 and are secured to the sections 131, 132 by rivets. In the apparatus 101, the length of the abutments 155, 155a in the circumferential direction of the flywheel 103 equals or closely approximates the length or width of the arms 144. FIG. 4 shows cupped spring retainers 159 which are installed between the end portions of the coil springs 145 on the one hand and the arms 144 on the other hand. The configuration of spring retainers 159 is or can be such that they act not unlike plungers or pistons, i.e., that their peripheral surfaces are closely adjacent the internal surfaces of the sections 131 and 132.

The aforementioned annular clearance or gap 154 forms part of an annular passage 162 which is nearly filled by the portion 149 of the flange 141 and is located between annular portions 160, 161 of internal surfaces of the sections 131 and 132. The gap 154 can be located only between the surface portion 160 and the flange 141 or only between the surface portion 161 and flange 141. Alternatively, the gap 154 can include two sections or portions, one adjacent the surface portion 160 and the other adjacent the surface portion 161.

As can be seen in FIG. 4, the apparatus 101 includes a damper 113 with four arcuate coil springs 145 each of which extends along an arc of approximately 82 degrees. Thus, the combined length of the four coils springs 145 equals approximately 90 percent of a complete circle. It is advisable to bend the coil springs 145 prior to introduction into the grooves 152, 153; this facilitates installation of such coil springs in the chamber 130 and reduces the likelihood of development of internal stresses in the springs. The bending prior to installation of coil springs 145 can involve a bending to the exact curvature of the grooves 152, 153 or a mere partial bending.

The chamber 130 is at least partially filled with a viscous fluid medium which is preferably a lubricant. The quantity of fluid medium is preferably selected in such a way that the medium fills the chamber 130 at least to the gap 154, i.e., that the compartment 151 is filled with fluid medium when the apparatus 101 rotates and the flywheels 103, 104 assume the neutral angular positions of FIG. 4. As mentioned above, the viscosity of the fluid medium can be so high (at all temperatures which are expected when the apparatus 101 is in use) that the fluid medium forms a ring whose configuration remains unchanged when the flywheel 103 ceases to rotate.

FIG. 4 shows that the flange 141 has a central opening 171 surrounded by an annulus of tooth-like projections 172 forming part of the aforementioned connection or coupling 142 and cooperating with complementary tooth-like projections 173 at the periphery of the disc 127. The projections 173 extend into recesses or tooth spaces 172a between the projections 172 of the flange 141. The coupling 142 allows for proper orientation of the flange 141 with reference to the sections 131, 132 and for a reduction of the width of the gap 154 so that the parts which define this gap can constitute a highly effective flow restrictor for the fluid medium which tends to flow into or from the compartment 151 of the chamber 130. As explained in connection with the apparatus 1, the coupling 142 further allows for the machining and/or other treatment of parts which are adjacent the clearance 154 with a lesser degree of accuracy without affecting the operation of the vibration damping apparatus.

The sealing means 174 between the radially innermost portion of the section 132 (radially inwardly of the gap 154) and the annular ventilating channel between the section 132 and flywheel 104 is similar to the sealing means 74 of FIG. 1a. The main difference between the sealing means 74 and 174 is that the sealing device 175 of FIG. 3 is fully coated with a layer of elastically or plastically deformable friction-reducing material and is held in the notch or socket of the radially innermost portion 132a of the section 132 by a carrier 180 which is secured to the section 132 by rivets 132b.

The outer side of the sealing device 175 defines with the adjacent portion of the section 132 an annular space 132c which serves to gather fluid medium that escapes between the inner marginal portion of the sealing device 175 and the dished outer marginal portion 176b of the sealing device or insert 176. The fluid medium which accumulates in the annular space 132c is forced back into the chamber 130 by flowing around the outer marginal portion of the sealing device 175 under the action of centrifugal force when the flywheel 103 is driven at a high rotational speed. The region of contact between the inner marginal portion of the sealing device 175 and the outer marginal portion 176b of the sealing device 176 is in axial alignment with the space 132c so that any fluid medium which leaks between the marginal portion 176b and the sealing device 175 is propelled into the space 132c by centrifugal force. The reference character 191 denotes in FIG. 3 a ring-shaped notch which is provided in the radially innermost portion 132a of the section 131 for the outer marginal portion of the sealing device 175.

The section 131 is nearer to the engine (not shown) than the section 132, and its central portion is bolted or otherwise rigidly secured to a protuberance 120 which extends axially and away from the output element of the engine and is surrounded by the antifriction bearing 16. The protuberance 120 has a cylindrical centering surface 120b and a radially extending locating shoulder 120c for the section 131, and the protuberance 120 is further formed with a cylindrical seat 120a for the inner race of the bearing 16. A retaining ring 122 is used to fix the flywheel 104 to the flywheel 103, e.g., by means of bolts which are used to fix the protuberance 120 to the section 131 of the flywheel 103. If desired, the protuberance 120 can be separably connected to the section 131 by screws or nuts and bolts, or these parts of the flywheel 103 can be permanently connected to each other by rivets, by welding or by upsetting the material of the protuberance 120 around the central portion of the section 131.

The assembling operation to assemble the apparatus 101 is or can be carried out in the same way or substantially in the same way as described in connection with FIGS. 1, 1a and 2. Thus, the antifriction bearing 16 is installed in the projection 143 of the flywheel 104 and the sealing device 175 is installed in the socket 191 of the section 132 before the flywheels 103, 104 are secured to each other by the retaining ring 122. The coupling 142 is assembled automatically in response to slipping of the inner race of the bearing 16 onto the centering surface or seat 120a of the protuberance 120. When the bearing 16 is properly mounted on the protuberance 120, the sealing device 175 bears against the outer marginal portion 176b of the sealing device 176 to seal the innermost portion of the chamber 130 from the atmosphere as a result of at least some axial deformation of the sealing device 175. The retaining ring 122 can be riveted, screwed, bolted or otherwise secured to the end face of the protuberance 120 so that its radially outermost portion overlies the inner race of the antifriction bearing 16.

The hydraulic or viscous damping action of fluid medium in the compartment 151 is the same as described in connection with the operation of the apparatus 1. Such action is attributable in part to expulsion of fluid medium from the compartment 151 via gap 154, in part to flow of fluid medium around the peripheral surfaces of the spring retainers 159 and in part to agitation of the fluid medium in the compartment 151.

In order to ensure that heat which is generated during welding of the sections 131, 132 to each other will not adversely affect the neighboring parts of the apparatus 101, particularly the movability of those parts which are to perform angular and/or other movements relative to each other (these parts include the flange 141, the coil springs 145, the abutments 155, 155a and the spring retainers 159), it is often desirable or necessary to coat certain parts with layers of suitable electrically insulating material. This prevents (a) bonding of parts which should remain free to move relative to each other and relative to the sections 131, 132, and (b) a change in the texture of material of the movable parts as a result of overheating. The layers of insulating material can be applied to those portions of the sections 131, 132 which need not be welded to each other and which need not be connected to an energy source in the course of the welding operation. Alternatively or in addition to such coating of the sections 131, 132, it is equally possible to apply coats or layers of electrically insulating material to the flange 141, to the spring retainers 159, to the coil springs 145 and to the abutments 155, 155a. It is not necessary to completely coat these parts, as long as they are coated with insulating material in regions of contact with the section 131 and/or 132. Phosphating is one of presently preferred methods of applying coats of electrically insulating material. Overheating of certain parts, such as of the cup-shaped spring retainers 159 and the abutments 155, 155a, can be avoided by making them from a non-conductive material (such as a suitable synthetic plastic substance). It is presently preferred to phosphatize portions of the sections 131, 132 and/or portions of the flange 141. The coil springs 145 can be phosphatized or coated with layers of lacquer. It is further within the purview of the invention to rely on thermally and/or electrically insulating layers or coats of ceramic or synthetic plastic material and/or coats or layers of grease. Such layers can be applied with advantage to portions of the sections 131, 132. It is desirable to select the insulating material or materials in such a way that they are compatible with the viscous fluid medium in the chamber 130.

In accordance with another presently preferred embodiment, it is possible to completely coat (e.g., phosphatize) some or all of the parts which must be electrically insulated from neighboring parts prior to start of the welding operation (e.g., to completely phosphatize the sections 131, 132) and to thereupon mechanically remove portions of the applied layers or coats, e.g., in a grinding machine which can be used to remove insulating material from the surface portions 134, 135 of the sections 131, 132 and from those portions of these sections which must be connected with a source of electrical energy. This ensures the establishment of optimum conditions for adequate heating by electric current and for proper bonding of the sections 131, 132 to each other. The utilization of electrically insulating layers or coats of phosphate is often desirable and advantageous because such layers exhibit highly satisfactory self-lubricating and wear-resistant characteristics.

The periphery of the section 131 is provided with a cylindrical seat 139 for a ring-shaped starter gear 140 which is preferably spot welded to the section 131, as at 140a. This is particularly desirable when the thickness of the section 131 is less than the axial length of the gear 140. The spot welds 140a can be replaced with arcuate welded seams or with a circumferentially complete welded seam.

The thickness of one of the sections 131, 132 can exceed the thickness of the other of these sections. As can be seen in FIG. 3, the thickness of the section 131 exceeds the thickness of the section 132.

The separately produced abutments 155, 155a can be replaced with abutments in the form of pockets which are formed by deforming selected portions of the sections 131, 132, e.g., during making of the grooves 152 and 153, so that riveting of discrete abutments to the sections 131, 132 can be dispensed with. Moreover, the recesses which are obtained as a result of making abutments in the form of pockets can replace the sockets 165, 166, i.e., these recesses can serve as a means for receiving the tips of prongs forming part of welding equipment and being used to maintain the sections 131, 132 in predetermined angular positions relative to each other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping torsional vibrations in the power train between an engine and a transmission, comprising a composite flywheel having a plurality of components which are rotatable relative to each other and include a first component connectable with the engine and a second component connectable with the transmission by way of a clutch, one of said components defining an annular chamber for a supply of viscous fluid medium; and damper means disposed in said chamber and arranged to yieldably oppose rotation of said first and second components relative to each other, said components forming at least two coaxial subassemblies and further comprising retaining means for connecting said subassemblies to each other, said subassemblies jointly comprising the following combinations:
   (a) one of said subassemblies having a first sealing device and the other of said subassemblies having a second sealing device cooperating with said first sealing device to seal said chamber from the atmosphere, and
   (b) one of said subassemblies including antifriction bearing means and the other of said subassemblies including a seat for said bearing means.

2. The apparatus of claim 1, wherein said annular chamber is defined by said first component, one of said subassemblies including said first component and said damper means and the other of said subassemblies including said second component.

3. The apparatus of claim 1, wherein said first and second components define an annular ventilating channel and said sealing devices seal said chamber from said channel.

4. Apparatus for damping torsional vibrations in the power train between an engine and a transmission, comprising a composite flywheel having a plurality of components which are rotatable relative to each other and include a first component connectable with the engine and a second component connectable with the transmission by way of a clutch, one of said components defining an annular chamber for a supply of viscous fluid medium; and damper means disposed in said chamber and arranged to yieldably oppose rotation of said first and second components relative to each other, said damper means being elastic in the circumferential direction of said flywheel, said components forming at least two coaxial subassemblies and further comprising retaining means for connecting said subassemblies to each other, said subassemblies jointly comprising the following combinations:

(a) one of said subassemblies having a first sealing device and the other of said subassemblies having a second sealing device to seal said chamber from the atmosphere, and (b) one of said subassemblies including a first coupling device and the other of said subassemblies including a complementary second coupling device, said coupling devices forming a torque transmitting connection between said subassemblies and having at least limited freedom of axial movement relative to each other, one of said coupling devices being connected with said one component by said elastic damper means.

5. The apparatus of claim 4, wherein said damper means comprises an output member including said first coupling device, said second sealing device including a sealing surface of one of said components.

6. The apparatus of claim 4, wherein said damper means includes energy storing resilient elements acting in the circumferential direction of said composite flywheel, and a flange-like output member engaging said resilient elements and having a central opening, one of said coupling devices being provided on said output member and surrounding said opening.

7. The apparatus of claim 6, wherein the other of said coupling devices is provided on the other of said components.

8. The apparatus of claim 7, wherein said other component includes a discrete flywheel and a disc-shaped member affixed to said discrete flywheel and including the other of said coupling devices.

9. The apparatus of claim 8, wherein said discrete flywheel has a side facing said one component and said disc-shaped member is secured to said side of said discrete flywheel and is held against axial movement relative thereto.

10. The apparatus of claim 4, wherein said annular chamber is defined by said first component, one of said subassemblies including said first component and said damper means and the other of said subassemblies including said second component.

11. The apparatus of claim 4, wherein said first and second components define an annular ventilating channel and said sealing devices seal said chamber from said channel.

12. The apparatus of claim 4, wherein one of said sealing devices includes a substantially washer-like sealing member.

13. The apparatus of claim 12, wherein said sealing member is elastically deformable in the axial direction of said composite flywheel.

14. The apparatus of claim 4, wherein one of said sealing devices is provided on said first component and the other of said sealing devices is provided on said second component, one of said sealing devices being maintained in axially stressed condition by the other of said sealing devices.

15. The apparatus of claim 4, wherein said damper means includes a substantially disc-shaped output member and said one component includes a section disposed between said output member and the other of said components, one of said sealing devices having an outer marginal portion in sealing engagement with said section.

16. Apparatus for damping torsional vibrations in the power train between an engine and a transmission, comprising a composite flywheel having a plurality of components which are rotatable relative to each other and include a first component connectable with the engine and a second component connectable with the transmission by way of a clutch, one of said components defining an annular chamber for a supply of viscous fluid medium; and damper means disposed in said chamber and arranged to yieldably oppose rotation of said first and second components relative to each other, said damper means being elastic in the circumferential direction of said flywheel, said components forming at least two coaxial subassemblies and further comprising retaining means for connecting said subassemblies to each other, said subassemblies jointly comprising the following combinations:

(a) one of said subassemblies having a first sealing device and the other of said subassemblies having a second sealing device cooperating with said first sealing device to seal said chamber from the atmosphere, (b) one of said subassemblies including antifriction bearing means and the other of said subassemblies including a seat for said bearing means, and (c) one of said subassemblies including a first coupling device and the other of said subassemblies including a complementary second coupling device, said coupling devices forming a torque transmitting connection between said subassemblies and having at least limited freedom of axial movement relative to each other, one of said coupling devices being connected with said one component by said elastic damper means.

* * * * *